(12) United States Patent
Petrillo, Jr. et al.

(10) Patent No.: US 7,475,203 B1
(45) Date of Patent: Jan. 6, 2009

(54) METHODS AND SYSTEMS FOR ENABLING NON-DESTRUCTIVE ERASURE OF DATA

(75) Inventors: Robert S. Petrillo, Jr., Uxbridge, MA (US); Derek Keith Richardson, Mount Colah (AU); James M. Whynot, Bridgewater, MA (US); Gilbert K. Alipui, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 308 days.

(21) Appl. No.: 11/391,935

(22) Filed: Mar. 28, 2006

(51) Int. Cl.
*G06F 12/00* (2006.01)

(52) U.S. Cl. .................. 711/159; 711/112; 711/163; 711/164

(58) Field of Classification Search .......... 711/159, 711/112, 163, 164
See application file for complete search history.

(56) References Cited

U.S. PATENT DOCUMENTS

2005/0216746 A1* 9/2005 Saika .................. 713/182
2006/0101190 A1* 5/2006 McLean ............... 711/100
2008/0072319 A1* 3/2008 Sakai .................. 726/21

* cited by examiner

*Primary Examiner*—Hyung S Sough
*Assistant Examiner*—Mehdi Namazi
(74) *Attorney, Agent, or Firm*—Muirhead and Saturnelli, LLC

(57) ABSTRACT

Methods and systems are disclosed that relate to the nondestructive erasure of data in a data storage system. An exemplary method includes providing a program that can generate instructions, which may be interpreted by the back end of the data storage system, to overwrite data on a disk drive.

20 Claims, 7 Drawing Sheets

```
┌─────────────────────────────────────────────────────────────────────────┐
│ ⬚ EMC Log Browser                                                 _ □ × │
│ File Edit Search Mark List Jump View Options Help                       │
│ 🗋 📂 💾 🖨 🔍 🔤 ↕ ⧉ ❓  ‖ REGULAR LOGS        ▼ │◀                   ▶│
│ TOTALCLEAR.LOG                                                          │
│ 1/294:1 │ C:\WORK_REQUESTS\WR81\LOGS\TEMP\TOTALCLEAR.LOG: 25 KB, 06/20/2005 16:02:32 │
│                                                                         │
│ *******************************************                             │
│ * TOTALCLEAR                          VERSION: 1.0.0.5   *              │
│ * SYMM SN: 000184701835              CODELEVEL. 5568-57-22 *            │
│ * AUTHORISED BY EMC EMPLOYEE #: 13829                    *              │
│ *******************************************                             │
│                                                                         │
│ <PROCESS COMMENCED AT:    06/17/2005 19:03:15 >                         │
│                                                                         │
│ NUMBER OF PHYSICAL DRIVES DETECTED:  190                                │
│ NUMBER OF PHYSICAL DRIVES SELECTED:  190                                │
│                                                                         │
│ THE FOLLOWING DRIVES CANNOT BE ERASED:                                  │
│   07a:D3    03b:C4    09b:C1                                            │
│                                                                         │
│ SELECTED PASSES:-                                                       │
│   PASS  1  DATA PATTERN: RANDOM                                         │
│   PASS  2  DATA PATTERN: RANDOM                                         │
│   PASS  3  DATA PATTERN: RANDOM                                         │
│   VERIFY                                                                │
│                                                                         │
│ PASS 01 OF 03 STARTED AT  06/17/2005  19:20:44                          │
│   ALL DRIVES COMPLETED PASS 1 OK                                        │
│ PASS 01 ENDED AT  06/17/2005  20:56:14                                  │
│                                                                         │
│ PASS 02 OF 03 STARTED AT  06/17/2005  20:56:14                          │
│   ALL DRIVES COMPLETED PASS 2 OK                                        │
│ PASS 02 ENDED AT  06/17/2005  22:31:45                                  │
│                                                                         │
│ PASS 03 OF 03 STARTED AT  06/17/2005  22:31:45                          │
│   ALL DRIVES COMPLETED PASS 3 OK                                        │
│ PASS 03 ENDED AT  06/18/2005  00:07:12                                  │
│                                                                         │
│ <PROCESS COMPLETED AT:    06/18/2005  01:57:03 >                        │
└─────────────────────────────────────────────────────────────────────────┘
```

FIG. 6

Labels: 610, 620a, 630, 620a, 640

FIG. 7

METHODS AND SYSTEMS FOR ENABLING NON-DESTRUCTIVE ERASURE OF DATA

BACKGROUND

A data storage system may be a significant asset. For example, a company may use a data storage system to store a large amount of information, some of which may be sensitive to the company and/or its customers. Similarly, a government organization or contractor may use a data storage system to store classified information. The user of a data storage system generally wants its data storage system to store its data reliably.

Nonetheless, there may be circumstances in which a user no longer wants to use its data storage system, or components thereof, to store its data. For instance, a user may want to upgrade disk drives within its data storage system. Similarly, a user may want to upgrade its storage system as a whole. The data on the old data storage system or components may then become a liability because its presence limits the extent to which the old system or components may be reused.

A user generally does not want its information to be available to others. Privacy and other legal or business concerns may obligate a user to ensure that access to its information is controlled. If the data storage system did not contain the user's information, a user may be able to sell or repurpose its data storage system without concern for the disclosure of its data. Similarly, if components of the data storage system did not contain the user's information, a user may be able to sell or repurpose the components without concern for the disclosure of data.

EMC Corp. has used a host-based kit—including a processor, a monitor, a keyboard, a communications link, and special software—to enable users of EMC's Clariion system to erase data contained thereon. A small number of these kits were built. Each kit weighs about 300 pounds and must be shipped to the site of the Clariion system prior to its use. Once on site, the kit requires special physical set-up and configuration of the target data storage system prior to the kit's use. The kit communicates with the front end of a Clariion system to erase data contained in the Clariion system. Thus, any instructions from the kit must be interpreted by both the front end and the back end of the system, before any persistent memory device is acted upon. Erasure time ranges from 2 to 72 hours depending on the data storage capacity of the entire system. EMC offers no certification of the erasure process done with the kit.

The inventors of the present invention recognized that a method or system for non-destructively erasing data in a data storage system that overcomes one or more of the limitations of the kit may have value. The inventors further recognized that a more flexible method or system for non-destructively erasing data in a data storage system would likely have the most value.

SUMMARY OF EXEMPLARY EMBODIMENTS

Methods and systems are disclosed that relate to a program that can generate instructions, which can be interpreted by a back end of a data storage system, to overwrite all of the data on a platter of a disk drive. One embodiment consistent with principles of the invention is a method for enabling non-destructive erasure of data in the data storage system. The method includes identifying a data storage system containing data to be erased with a unique identifier, providing a program for installation and execution on a service processor associated with the data storage system, and providing a key file including the identifier. The program checks the validity of the key file, generates instructions, which can be interpreted by a back end of the data storage system to overwrite all of the data on a platter of a disk drive, and generates a log file.

Another embodiment consistent with principles of the invention is also a method for enabling non-destructive erasure of data in a data storage system. The method includes receiving authorization to enable erasure of the data storage system containing data to be erased, transmitting a program for installation and execution on a service processor associated with the data storage system, and transmitting a key file including an identifier of the data storage system. The program and the key file are both transmitted via a digital communications link, although they may be transmitted via different digital communications links. The program checks the validity of the key file, generates instructions, which can be interpreted by a back end of the data storage system to overwrite all of the data on a platter of a disk drive, and generates a log file.

Another embodiment consistent with principles of the invention is a computer-readable medium including instructions to enable non-destructive erasure of data in a data storage system. The medium includes a program for installation and execution on a service processor associated with a data storage system containing data to be erased and a script for installing the program on the service processor.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 6 illustrates a portion of an exemplary log file generated by a program for non-destructive erasure of data; and FIG. 7 illustrates another portion of an exemplary log file generated by a program for non-destructive erasure of data.

DETAILED DESCRIPTION

Reference is now made in detail to illustrative embodiments of the invention, examples of which are shown in the accompanying drawings.

Figure 1:
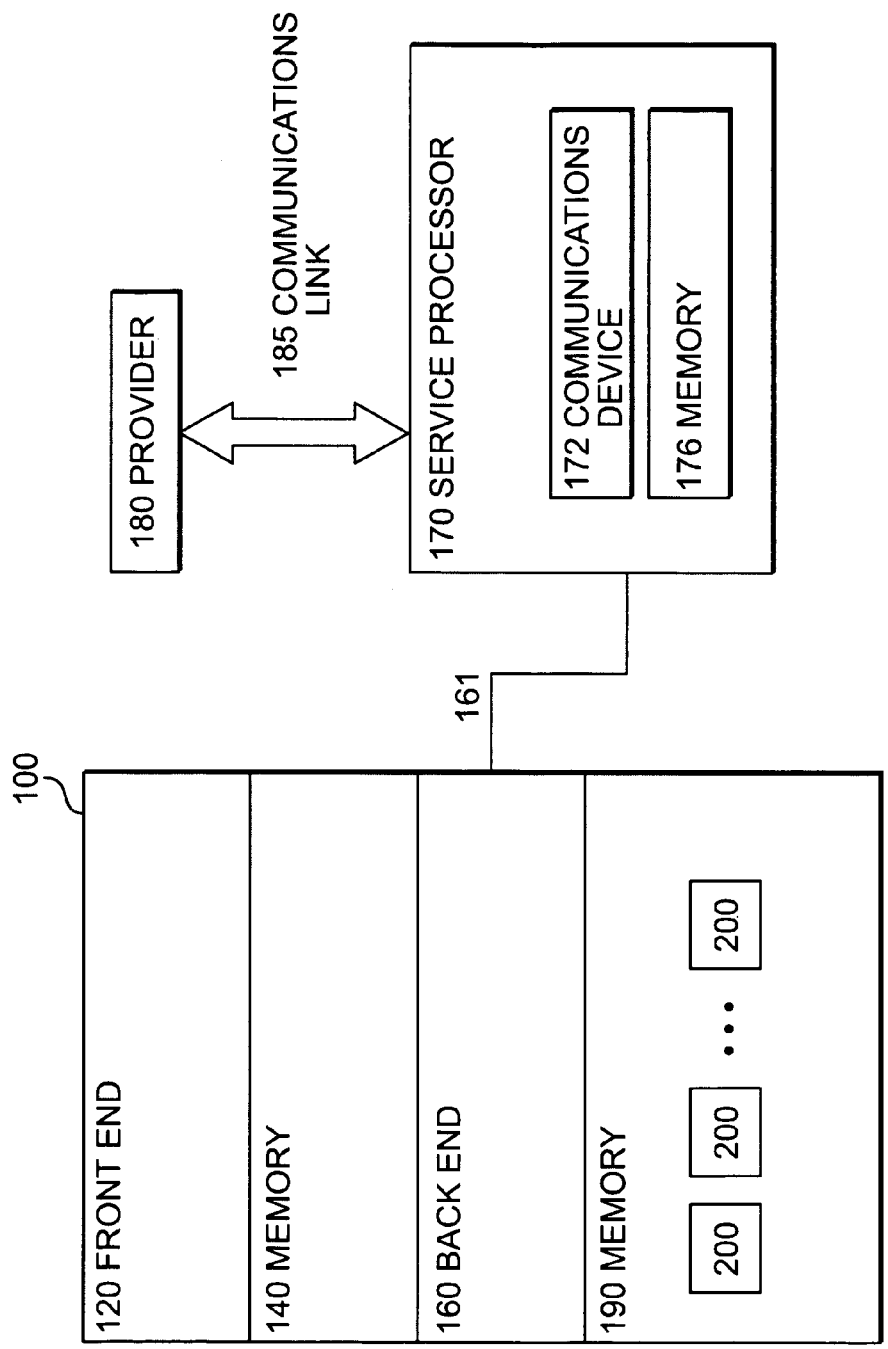
FIG. 1 illustrates one illustrative embodiment of a data storage system and an associated service processor consistent with features and principles of the present invention.

FIG. 1 illustrates an exemplary data storage system 100, which can be the target for erasure, and a service processor 170, which can be used in erasing data on system 100. System 100 represents a typical data storage system including front end 120, memory 140, back end 160, and memory 190. Memory 190 includes one or more disk drives 200 that store data. Any suitable combination of hardware, software, and/or firmware can be used to implement the above components. System 100 can feature a multiprocessing environment. For example, system 100 can be a Symmetrix DMX platform sold by EMC Corp., configured with a Symm/K operating system and testing software. The invention, however, is not limited to a particular type of data storage system, and can be used to erase data in many different types of data storage systems, such as the Clariion, Cellera, Centera, EDM, and Connectrix data storage systems.

A front end, as the term is used herein, is hardware and/or software responsible for managing the interaction and the exchange of data between volatile memory and the attached host systems, such as servers. Front end 120 includes applications that interact directly with client servers. Front end 120 may include a plurality of real or virtual interfaces or sockets to enable system 100 to respond to processing requests from client computers. Front end 120 enables access to memory 140.

Memory 140 is general-purpose memory. Memory 140 can include volatile memory. Memory 140 can include cache memory. In one embodiment, memory 140 is configured as random access memory (RAM) volatile cache memory. Memory 140 can include a copy of data that was in memory 190. Memory 140 can include, additionally or alternatively, data that will be, but is not yet, in memory 190. For example, memory 140 can include a copy of some data from a disk drive 200 in memory 190.

A back end, as the term is used herein, is hardware and/or software responsible for managing the interaction and the exchange of data between volatile memory and persistent memory, such as disk drives. Back end 160 includes the core computing applications doing the work in system 100. Back end 160 can include the operating system of system 100. Back end 160 can be one or more hardware devices, which implement microcode. Back end 190 manages the interaction and the exchange of data between memory 140 and memory 190. Memory 190 includes persistent memory. Memory 190 may include a plurality of disk arrays. There may be redundant storage of data within memory 190. For example, two disk drives 200 in memory 190 may include the same data.

Service processor 170 is not part of system 100, but is associated with system 100. Service processor 170 can communicate with back end 160 of system 100 via communications link 161, which can be for example an Ethernet link. Service processor 170 can monitor the operation of the memory 190 and report an error. Service processor 170 can be used to control the operation and configuration of memory 190 of system 100. Service processor 170 can undertake complex tasks by executing computer programs, such as scripts, that enable control instructions to be issued to back end 160, and data points to be monitored without human intervention.

Service processor 170 may include a laptop, a personal computer, a computer chip, a digital signal processor board, and/or any other information-processing device or combination of devices. Service processor 170 includes memory 176 and communications device 172. Memory 176 may include on-board memory, cache memory, random access memory, flash memory, virtual memory, programmable read-only memory, or any other device for storing data. Service processor 170 may include one or more communications devices 172, which may be the same or different types. Communications device 172 may be a telephone or cable modem, a DSL connection, a T1 line connection, or any type of communications port. Communications device 172, for example, may be a secure telephone system modem.

Communications device 172, in some embodiments, is one end of communications link 161. In these embodiments, communications device 172 enables service processor 170 to provide instructions to back end 160 of system 100. Communications device 172, in some embodiments, is one end of communications link 185. In these embodiments, communications device 172 enables service processor 170 to communicate with provider 180. Provider 180, for example, can be the licensor of a program.

Consistent with features and principles of the present invention, a program installed in memory 176 of service processor 170 enables erasure of data in system 100. In the foregoing illustrative embodiment, service processor 170 receives this program from provider 180 via communications link 185. A user then executes the program to erase data in system 100.

Figure 2:
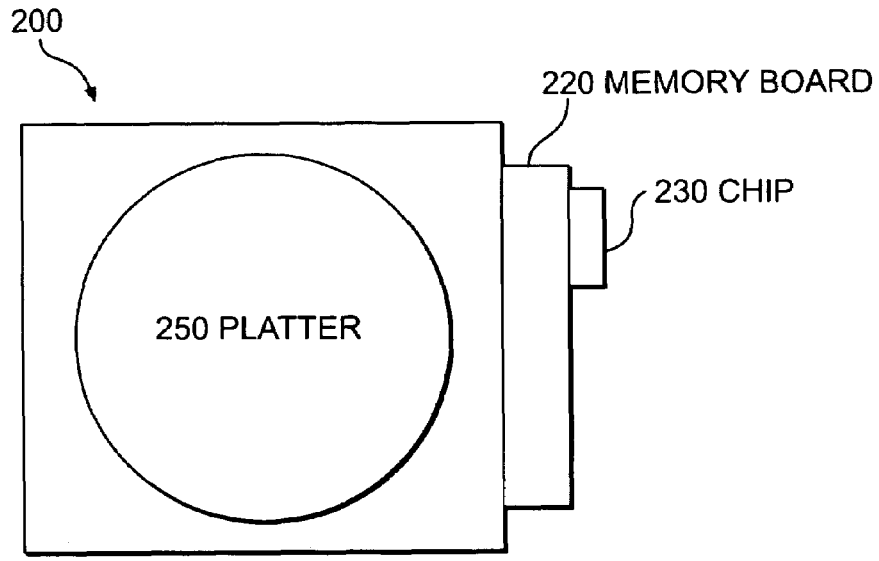
FIG. 2 illustrates an exemplary disk drive for use as memory 200 of FIG. 1.

FIG. 2 illustrates an exemplary memory 200 for use in the system of FIG. 1. Disk drive 200 includes a platter 250 and a memory board 220. Memory board 220 includes chip 230. Memory board 220 is required to make any data on platter 250 accessible. Chip 230 typically includes the name of the disk manufacturer, the disk model, and the disk serial number. This information can be used to identify a disk drive whose platter 250 is overwritten or whose platter 250 cannot be overwritten.

Figure 3:
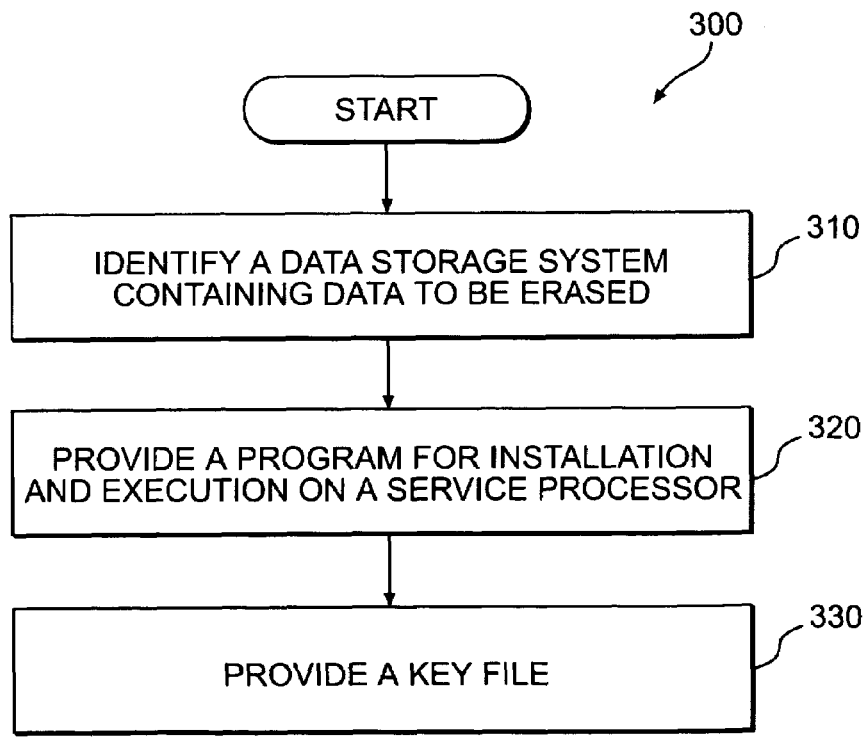
FIG. 3 illustrates a flow chart of an exemplary method for enabling the non-destructive erasure of data in a data storage system.

FIG. 3 illustrates a portion of an exemplary method 300 for enabling the non-destructive erasure of data in a data storage system, such as data storage system 100 in FIG. 1. In stage 310, a data storage system containing data to be erased is identified. The data storage system may be identified, for example, by a unique identifier such as a serial number for the system. The data storage system may alternatively be identified by its location or the name of an associated entity. For example, the user's name and/or location may be provided and used to identify other information about the data storage system. The data storage system may be identified by its owner, its user, or a provider 180.

In stage 320, a program is provided for installation and execution on a service processor, such as service processor 170 in FIG. 1. In stage 330, a key file including an identifier of a data storage system, such as data storage system 100 in FIG. 1, is provided. The key file preferably is adapted to expire after some time to prevent unintentional erasure of data. The key file can also be encrypted or can include a digital signature to prevent unintentional erasure of data. The key file can be created by the user of the data storage system 100, or a provider 180. The key file is stored, for example, on memory 176 of service processor 170. With the program and key file, a user can erase data in data storage system 100 using service processor 170.

To erase data on system 100 of FIG. 1, the user installs and executes the program on service processor 170. In execution, the program checks the validity of the key file in memory 176. If the key file is valid, the program proceeds and generates a user interface on service processor 170 that enables the user to make selections and generate instructions, which can be interpreted by the back end of the data storage system to overwrite data in memory 190. In particular, the program can erase all of the data on a platter of a disk drive 200. In execution, the program also generates a log file in memory 176. According to alternate embodiment consistent with FIG. 1, provider 180 can remotely install the program on service processor 170 and/or erase data on data storage system 100.

Unintentional erasure of data on a data storage system is not desirable. Thus, the program can include additional security features to prevent unintentional erasure of data in the data storage system. For example, a password may be required to install and/or execute the program. Similarly, a valid user identification may be required to install and/or execute the program.

Figure 4A:
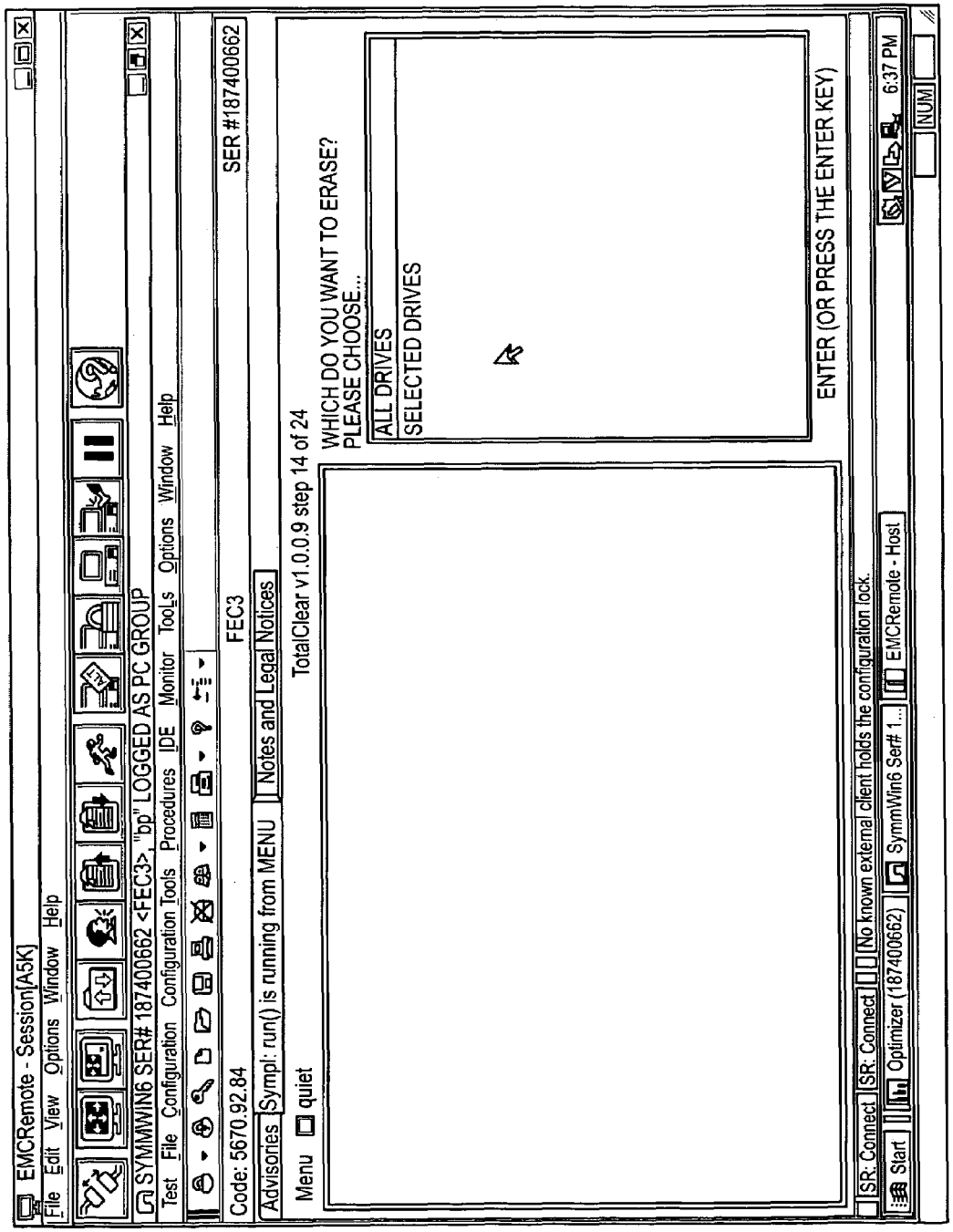
FIGS. 4A and 4B illustrate an exemplary user interface generated by a program provided in the method of FIG. 3.
Figure 4B:
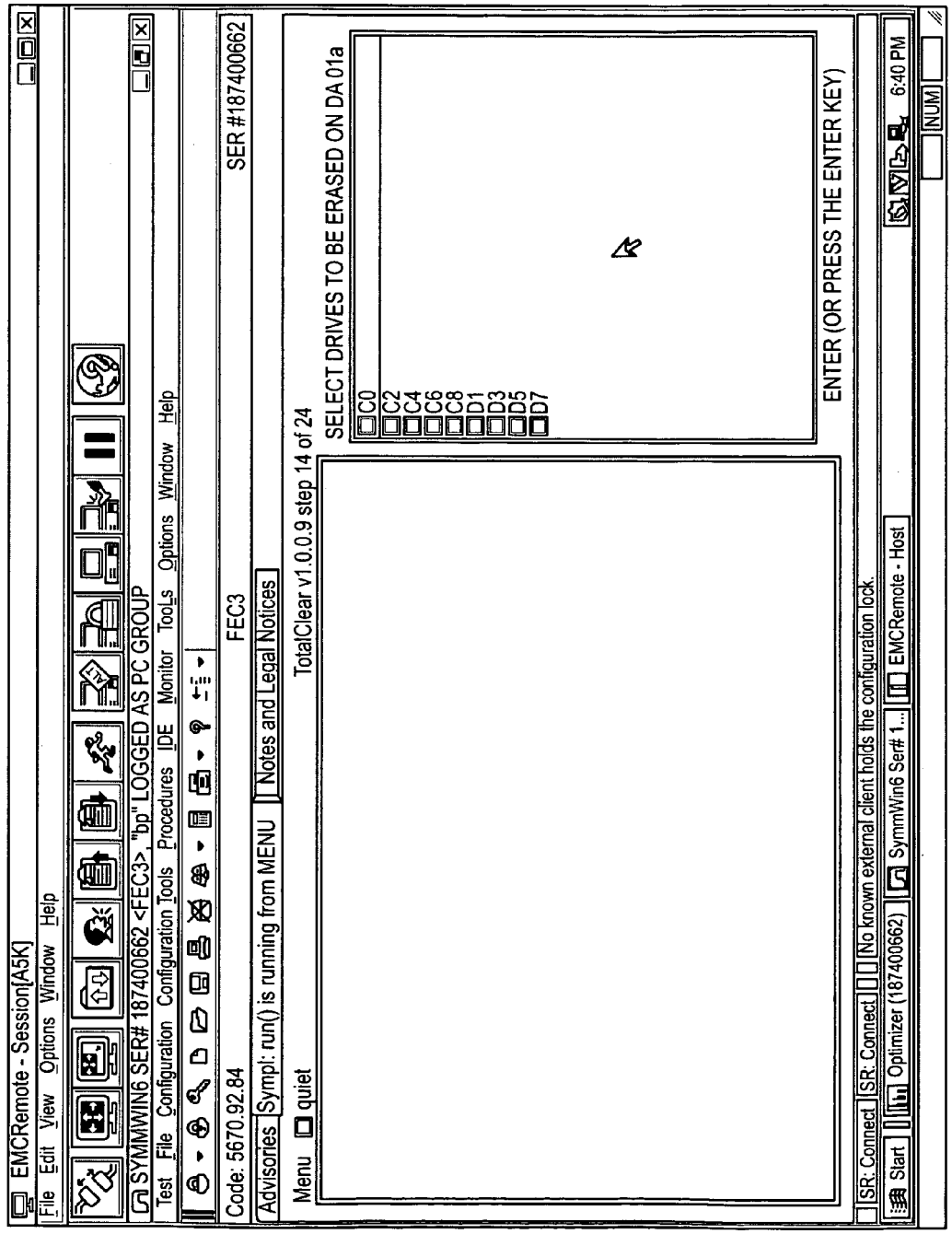

In execution, the program provided in stage 320 generates a user interface that enables a user to select individual elements in memory 190 for erasure. FIGS. 4A and 4B illustrate an exemplary user interface that enables a user to select individual elements in memory 190 for erasure. The program may generate a visual confirmation of the selected memory element or elements. For example, where a disk drive 200 in memory 190 is selected, the program may provide instructions, which can be interpreted by the back end of the data storage system, to turn on an LED associated with the disk drive. Additionally or alternatively, the program may generate instructions to display a diagram of the data storage system with the selected memory element or elements highlighted.

The program also preferably reports the status of its execution. For example, the program can report if one or more memory elements cannot be overwritten. This indicates, for example, that there is an operational problem with the memory element. This feature enables the memory element to be replaced so that the erasure of the data storage system can be satisfactory.

The program, in some embodiments, generates an interface that enables the user to select a pattern to be used to overwrite data in one or more memory elements in memory 190. For example, data can be overwritten with zeros, ones, and/or a random pattern. The program can include a random pattern generator, and save a generated pattern for later comparison to the contents of an overwritten memory element.

Similarly, the program, in some embodiments, generates an interface that enables the user to select a number of times for data in one or more memory elements in memory 190 to be overwritten. For example, the interface can enable each memory element to be overwritten one to three times. The result and status of each pass can be recorded in the log file. The interface may offer the user the flexibility to ensure that the erasure complies with an exacting standard, such as the DOD 5220.22-M specification, or a lesser standard that satisfies the user's needs.

Figure 5:
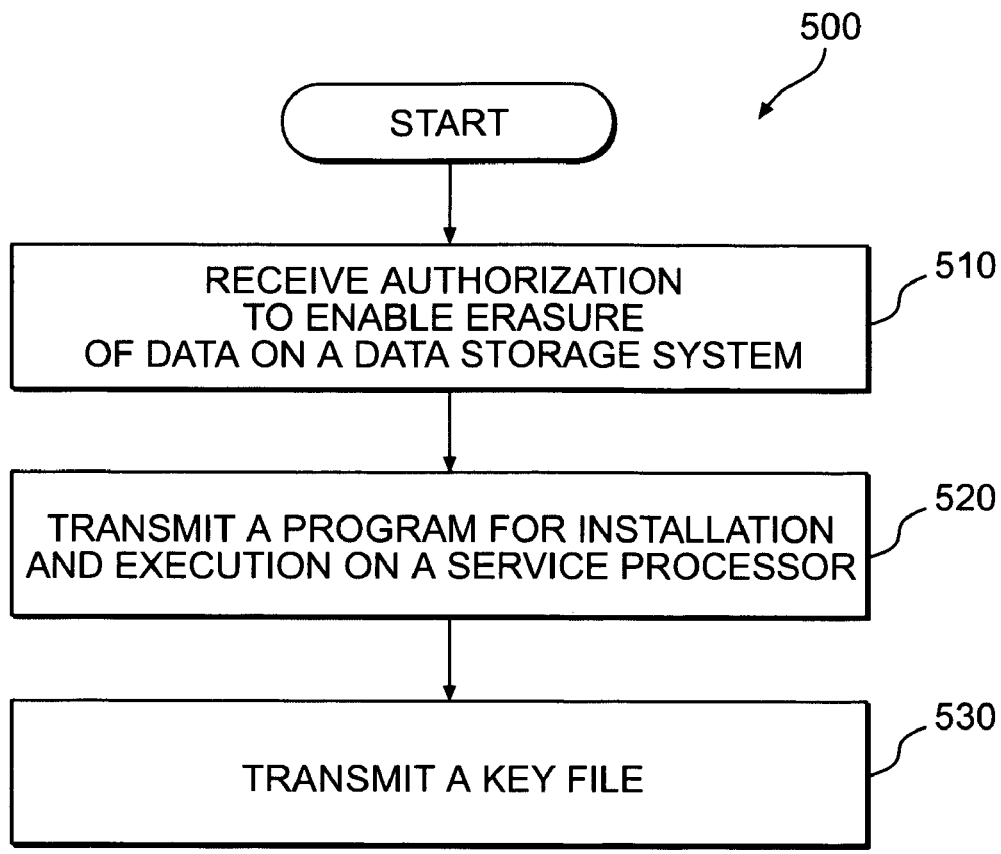
FIG. 5 illustrates a flow chart of another exemplary method for enabling the non-destructive erasure of data in a data storage system.

FIG. 5 illustrates a portion of another exemplary method 500 for enabling the non-destructive erasure of data in a data storage system, consistent with features and principles of the present invention. In stage 510, authorization to enable erasure of data on a data storage system is received. The data storage system is identified by a unique identifier. The authorization, in embodiments of the invention, is a letter signed by the user, an encrypted email, a digitally signed email, or any other accepted way for the user to indicate its authorization to enable the erasure of data on the data storage system.

In stage 520, a program for installation and execution on a service processor is transmitted via a first digital communications link. In stage 530, a key file including the identifier is transmitted via a first digital communications link. The program and/or key file in embodiments of method 500 share features and functionality of those discussed above with respect to method 300. The digital communications link in embodiments of the invention is a dial-up connection, a wireless digital telephone connection, a secure internet session, an email, or any other means of digitally transmitting data. The first and second digital communications link may be the same or different communications links.

In one exemplary use of method 500, provider 180 receives an executed letter from the user of data storage system 100 via first class mail. In response, provider 180 emails the program to the user via communications link 185. Thereafter, provider 180 emails the key file to the user via communications link 185. The user accesses both email with service processor 170. The user then installs the program and uses it with the key file to erase platter 250 of disk drive 200. In the exemplary embodiment, the program could be used again later. For instance, if provider 180 receives a second executed authorization letter months later, it can email the user another key file in response.

Figure 7:
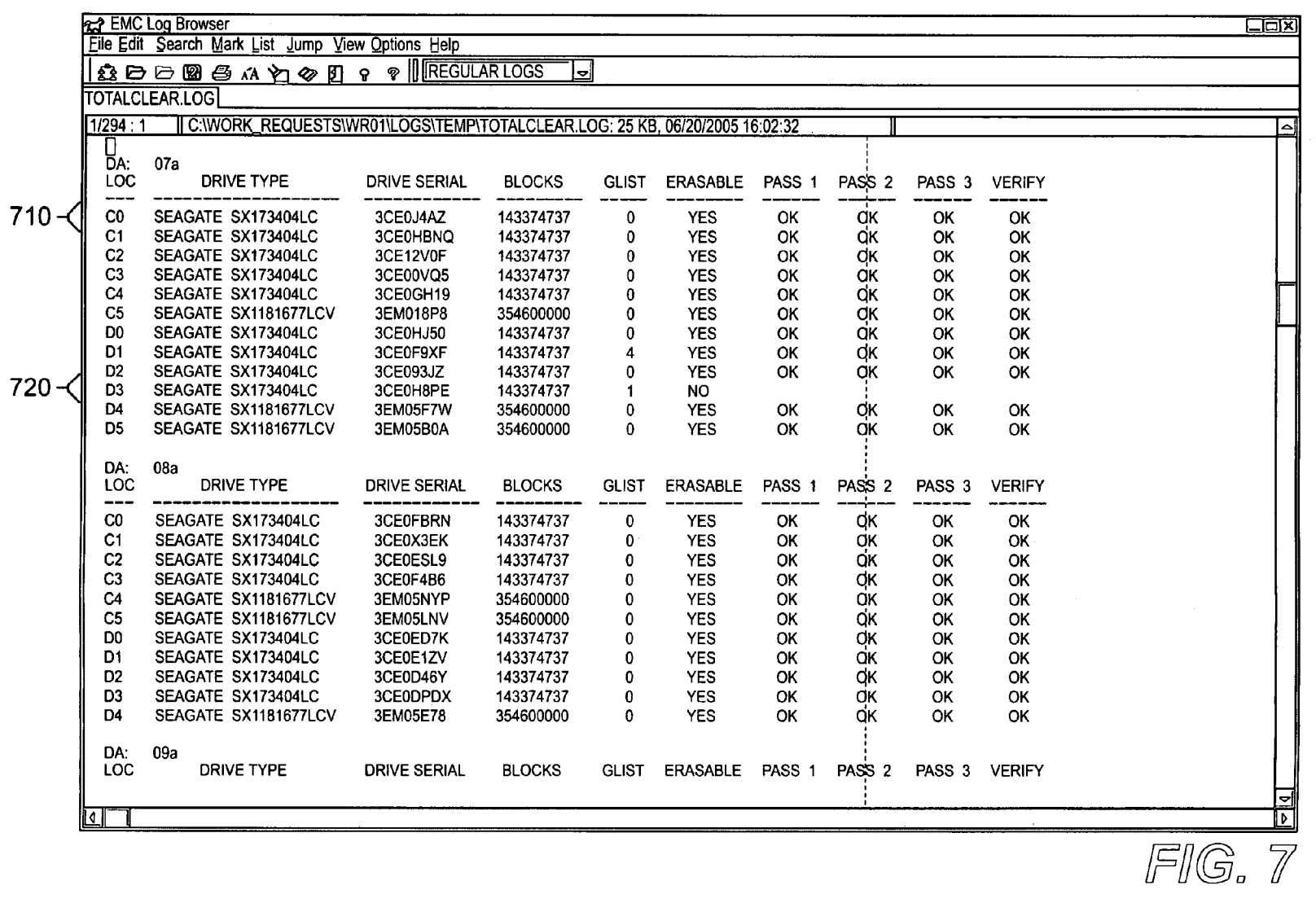

FIGS. 6 and 7 each illustrate a portion of an exemplary log file according to one illustrative embodiment consistent with the features and principles of the present invention. The program of methods 300 or 500 can generate a log file in execution. For example, when the program is executed on service processor 170 to erase data in data storage system 100, the log file can be stored in memory 176.

As shown in FIG. 6, the log file includes a header, an indication of the user's selections, and an indication of the results of the execution of the program. The exemplary header in section 610 includes the name and version of the program, an identifier of the data storage system containing data to be erased, and an identifier of a person authorizing the use of the program on the system. The exemplary user selections indicate, in section 620a, that the user has selected memory 190 in its entirety for erasure and, in section 620b, that the user wants memory 190 to be overwritten with a random data pattern three times and then the results to be verified.

In section 630, the log file in FIG. 6 identifies certain disk drives 200 that could not be erased—namely, disk drive D3 in array 07a, disk drive c4 in array 086, and disk drive C1 in array 096. In embodiments, the program identifies such memory elements to the user and gives the user the option to replace the elements before proceeding with the erasure. This feature ensures that erasure can comply with whatever erasure selections the user has selected.

In section 640, the log file in FIG. 6 illustrates exemplary results identifying the result, start, and end time of each overwriting pass. In comparison to the estimated system erasure time for the host-based kit described in the background, a program consistent with features and principles of the invention can erase data in a data storage system including one hundred ninety 73 and 181 gB disk drives in on the order of one-tenth of the time.

Consistent with features and principles of the present invention, FIG. 7 illustrates another portion of an exemplary log file reporting detailed results of the execution of the program. For each selected memory element, the exemplary results illustrated in FIG. 7 indicate its general location, its specific location, its manufacturer's name and model number, its serial number, the number of blocks it includes, whether it was erasable, and the result of each pass and any verification. For example in section 710, FIG. 7 illustrates that, in disk array 07*a* at location C0, a Seagate SX173404LC disk drive with the serial number 3CE0J4AZ and 143374737 blocks of memory was found to be erasable, was overwritten in each of three passes, and passed the verification test. In embodiments of the invention, this result indicates that the platter 250 of the Seagate SX173404LC disk drive with the serial number 3CE0J4AZ in data storage system 100 was successfully overwritten. Similarly in section 720, FIG. 7 illustrates that, in disk array 07*a* at location D3, a Seagate SX173404LC disk drive with serial number 3CE0H8PE and 143374737 blocks of memory was found not to be erasable.

In operation, the program generates a user interface for display on service processor 170 that enables a user to make selections and generate instructions, which can be interpreted by the back end of the data storage system, to read data on a selected disk drive 200. The data read from the platter 250 of the selected disk drive 200 can then be compared to the user's selected pattern to verify the results of the overwriting process. For example, where the user has selected zeros to overwrite the contents of a disk drive and all zeros are read from the platter of the disk drive, the overwriting process can be deemed a success. Similarly, according to one embodiment, where the user has selected a random pattern to overwrite the contents of a disk drive, the program generates a random pattern and stores it in the memory of a service processor for later comparison to the data read from the platter of the selected disk drive. If the data read from the platter matches the random pattern, the overwriting process can be deemed a success.

Consistent with features and principles of the present invention, the entire contents of a platter need not be read in order to verify the results of the overwriting process. For example, certain tracks on a platter can be read to verify the results of the overwriting process. Similarly, consistent with features and principles of the present invention, the number and/or location of the tracks on a platter to be read for verification may vary based on the size or type of the selected disk drive.

One of ordinary skill in the art will appreciate that the log file can be used as a basis for certifying the occurrence and quality of the erasure of data in a data storage system or components thereof.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for enabling non-destructive erasure of data in a data storage system:
   identifying a data storage system containing data to be erased with a unique identifier;
   providing a program for installation and execution on a service processor associated with the data storage system, wherein the service processor is separate from the data storage system; and
   providing a key file comprising the identifier;
   wherein the program checks the validity of the key file, generates instructions that are provided from the service processor to the data storage system, which may be interpreted by a back end of the data storage system, to overwrite all of the data on a platter of a disk drive of the data storage system, and generates a log file.

2. The method of claim 1 wherein the program enables a user to select one or more disk drives in the data storage system to be overwritten.

3. The method of claim 1 wherein the program identifies a disk drive that cannot be overwritten.

4. The method of claim 1 wherein the program generates a report of an erasure of data.

5. The method of claim 1 wherein the program generates instructions, which may be interpreted by the back end of the data storage system, to read at least a portion of the data on the platter of the disk drive before generating the report.

6. The method of claim 1 wherein the report includes the identifier and certifies that the erasure complies with a specification.

7. The method of claim 1 wherein the report certifies that the erasure complies with DOD 5220.22-M specifications.

8. The method of claim 1 wherein the key file expires after a period of time.

9. The method of claim 1 wherein the key file is encrypted.

10. The method of claim 1 further comprising providing a script for installing the program wherein a password is required to complete the script.

11. The method of claim 1 wherein the identifier is a Symmetrix frame serial number.

12. The method of claim 1 wherein the program is written in a proprietary language.

13. A method for enabling non-destructive erasure of data in a data storage system:
   receiving authorization to enable erasure of data in a data storage system, wherein the data storage system is identified by a unique identifier;
   transmitting, via a first digital communications link, a program for installation and execution on a service processor associated with the data storage system, wherein the service processor is separate from the data storage system; and
   transmitting, via a second digital communications link, a key file comprising the identifier;
   wherein the program checks the validity of the key file, provides instructions from the service processor to the data storage system, which may be interpreted by a back end of the data storage system, to overwrite all of the data on a platter of a disk drive of the data storage system, and generates a log file.

14. The method of claim 13 wherein the first digital communications link is a dial-up communications link.

15. The method of claim 13 wherein the first digital communications link is a secure session of communications via the Internet.

16. The method of claim 13 wherein the program enables a user to select one or more disk drives in the data storage system to be overwritten.

17. The method of claim 13 wherein the program generates instructions to read at least a portion of the data on the platter of the disk drive and generates a report of an erasure of data, wherein the report includes an identifier of the disk drive.

18. A computer-readable medium comprising instructions to enable non-destructively erasure of data in a data storage system, the medium comprising:

a program for installation and execution on a service processor associated with a data storage system containing data to be erased, wherein the service processor is separate from the data storage system; and a script for installing the program on the service processor;

wherein the program checks the validity of a key file comprising a unique identifier of the data storage system, generates instructions that are provided from the service processor to the data storage system, which may be interpreted by a back end of the data storage system, to overwrite all of the data on a platter of a disk drive of the data storage system, and generates a log file.

19. The computer-readable medium of claim 18 wherein the program generates instructions, which may be interpreted by the back end of the data storage system, to read at least a portion of the data on the platter of the disk drive before generating the report.

20. The computer-readable medium of claim 18 wherein the key file expires after a period of time.

* * * * *